(12) United States Patent
Noh et al.

(10) Patent No.: US 9,883,478 B2
(45) Date of Patent: Jan. 30, 2018

(54) METHOD FOR POSITIONING USER EQUIPMENT IN FULL-DUPLEX WIRELESS COMMUNICATION SYSTEM AND APPARATUS THEREFOR

(71) Applicant: LG ELECTRONICS INC., Seoul (KR)

(72) Inventors: Kwangseok Noh, Seoul (KR); Jaehoon Chung, Seoul (KR); Genebeck Hahn, Seoul (KR); Eunjong Lee, Seoul (KR); Jinmin Kim, Seoul (KR); Kukheon Choi, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/541,618

(22) PCT Filed: Jan. 9, 2015

(86) PCT No.: PCT/KR2015/000230
§ 371 (c)(1),
(2) Date: Jul. 5, 2017

(87) PCT Pub. No.: WO2016/111394
PCT Pub. Date: Jul. 14, 2016

(65) Prior Publication Data
US 2017/0332340 A1    Nov. 16, 2017

(51) Int. Cl.
*H04W 24/00* (2009.01)
*H04W 64/00* (2009.01)
*G01S 5/02* (2010.01)
*H04L 5/14* (2006.01)

(52) U.S. Cl.
CPC ............ *H04W 64/00* (2013.01); *G01S 5/0252* (2013.01); *H04L 5/14* (2013.01)

(58) Field of Classification Search
CPC .............................. H04W 64/00; G01S 5/0252
USPC .......................................... 455/456.1–456.3
See application file for complete search history.

(56) References Cited

U.S. PATENT DOCUMENTS

| | | | | |
|---|---|---|---|---|
| 5,444,838 | A * | 8/1995 | Kommrusch | G06T 17/00 345/421 |
| 2008/0158062 | A1 * | 7/2008 | Fullerton | G01S 5/0289 342/463 |
| 2009/0029715 | A1 * | 1/2009 | Burchardt | H04W 64/00 455/456.1 |

(Continued)

*Primary Examiner* — Charles Shedrick
(74) *Attorney, Agent, or Firm* — Birch, Stewart, Kolasch & Birch, LLP

(57) ABSTRACT

The present invention relates to a method for positioning multiple user equipments (UEs) by a base station in a wireless communication system supporting full-duplex communication and an apparatus therefor. More specifically, the present invention comprises: setting a unit distance on the basis of the magnitude of inter-device interference (IDI) with respect to a first UE; and establishing multiple boundaries around each of the multiple UEs and the base station according to relative distances on the basis of the unit distance and checking whether the boundaries overlap each other. Here, the relative distances indicate with respect to the multiple UEs, measured on the basis of the magnitude of inter-device interference (IDI).

10 Claims, 18 Drawing Sheets

(56) References Cited

U.S. PATENT DOCUMENTS

| | | | |
|---|---|---|---|
| 2010/0151876 A1* | 6/2010 | Park | H04W 72/082 |
| | | | 455/452.2 |
| 2011/0217987 A1* | 9/2011 | van de Groenendaal | |
| | | | G01S 5/12 |
| | | | 455/456.1 |
| 2012/0258729 A1* | 10/2012 | Siomina | G01S 3/28 |
| | | | 455/456.1 |

* cited by examiner (a) Control plane protocol stack (b) User plane protocol stack

| Measuring UE \ Target UE | A | B | C | D | E | BS |
|---|---|---|---|---|---|---|
| A | - | 3.6 | 8.4 | 5.5 | 6.7 | 1 |
| B | 3.6 | - | 9.8 | 7.4 | 10 | 3.5 |
| C | 8.4 | 9.8 | - | 13.4 | 6.5 | 7.5 |
| D | 5.5 | 7.4 | D | - | 9.2 | 6.5 |
| E | 6.7 | 10 | 6.5 | 9.2 | - | 6.5 |
| BS | 1 | 3.5 | 7.5 | 6.5 | 6.5 | - |

METHOD FOR POSITIONING USER EQUIPMENT IN FULL-DUPLEX WIRELESS COMMUNICATION SYSTEM AND APPARATUS THEREFOR

CROSS REFERENCE TO RELATED APPLICATIONS

This application is the National Phase of PCT International Application No. PCT/KR2015/000230, filed on Jan. 9, 2015, all of which are hereby expressly incorporated by reference into the present application.

TECHNICAL FIELD

The present invention relates to a wireless communication system, and more particularly, to a method of measuring a UE position in a full-duplex wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

In order to assist efficient management of a wireless communication system of a base station, a UE periodically and/or aperiodically reports information on a current channel state to the base station. Since the information on the channel state includes results, which are calculated in consideration of various situations, it is necessary to have a more efficient reporting method.

DISCLOSURE OF THE INVENTION

Technical Task

Based on the aforementioned discussion, the present invention intends to propose a method of measuring a UE position in a full-duplex wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of measuring positions of a plurality of UEs, which are measured by a base station in a wireless communication system supporting full-duplex communication, includes the steps of setting a unit distance based on an IDI (inter-device interference) size to a first UE, determining at least one intersection region, which is overlapped between at least one first boundary configured according to at least one first relative distance based on the unit distance on the basis of the base station and at least one second boundary configured according to at least one second relative distance based on the unit distance on the basis of the first UE, as at least one or more position candidates for a second UE, and assuming a specific position candidate among the at least one or more position candidates as a position of the second UE and checking whether or not at least one third boundary configured according to at least one third relative distance based on the unit distance on the basis of the assumed position of the second UE is overlapped with the intersection region. In this case, the at least one first relative distance corresponds to distances of a plurality of the UEs which are measured by the base station according to the IDI size, the at least one second relative distance corresponds to distances of a plurality of the UEs which are measured by the first UE according to the IDI size, and the at least one third relative distance corresponds to distances of a plurality of the UEs which are measured by the second UE according to the IDI size.

Preferably, if the at least one third boundary is overlapped with the intersection region, the method can further include the step of determining the specific position candidate as the position of the second UE.

Preferably, the IDI size can be determined by a first UE performing full-duplex communication-based downlink communication based on an interference amount caused by a second UE performing full-duplex communication-based uplink communication.

Preferably, the IDI size can be determined according to at least one selected from the group consisting of a distance between a measuring UE and a target UE, transmit power of the target UE, and information on whether the target UE performs uplink or downlink.

Preferably, the at least one intersection region is configured to include an error region of an IDI (inter-device interference) measurement value. More preferably, the at least one or more position candidates for the second UE can be determined by a center point of the error region. In this case, the error region can be determined according to the number of bits for performing feedback on the IDI measurement value.

Preferably, if at least a part of the error region exceeds a predefined maximum error region range, the method can further include the step of reconfiguring the second UE.

Preferably, if the at least one third boundary is not overlapped with the intersection region, the method can further include the step of reconfiguring the second UE.

To further achieve these and other advantages and in accordance with the purpose of the present invention, according to a different embodiment, a base station performing UE position measurement in a wireless communication system supporting full-duplex communication includes an RFU (radio frequency unit) and a processor, the processor configured to set a unit distance based on an IDI (inter-device interference) size to a first UE, the processor configured to determine at least one intersection region, which is overlapped between at least one first boundary configured according to at least one first relative distance based on the unit distance on the basis of the base station and at least one second boundary configured according to at least one second relative distance based on the unit distance on the basis of the first UE, as at least one or more position candidates for a second UE, the processor configured to assume a specific position candidate among the at least one or more position candidates as a position of the second UE and check whether or not at least one third boundary configured according to at least one third relative distance based on the unit distance on the basis of the assumed position of the second UE is overlapped with the intersection region. In this case, the at least one first relative distance corresponds to distances of a plurality of the UEs which are measured by the base station according to the IDI size, the at least one second relative distance corresponds to distances of a plurality of the UEs which are measured by the first UE according to the IDI size, and the at least one third relative distance corresponds to distances of a plurality of the UEs which are measured by the second UE according to the IDI size.

Advantageous Effects

According to embodiments of the present invention, it is able to efficiently measure a UE position in a full-duplex wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figure 1:
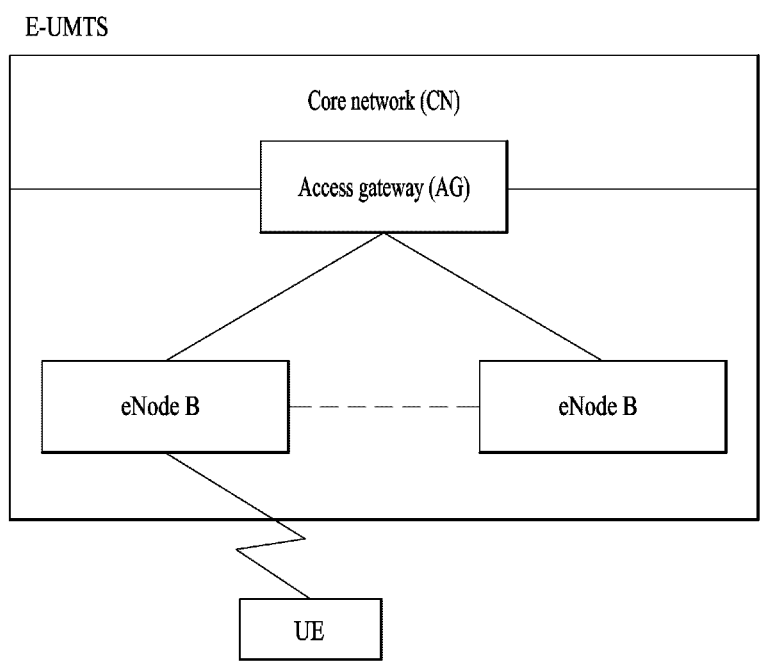
FIG. 1 is a schematic diagram of E-UMTS network structure as one example of a wireless communication system.
Figure 2:
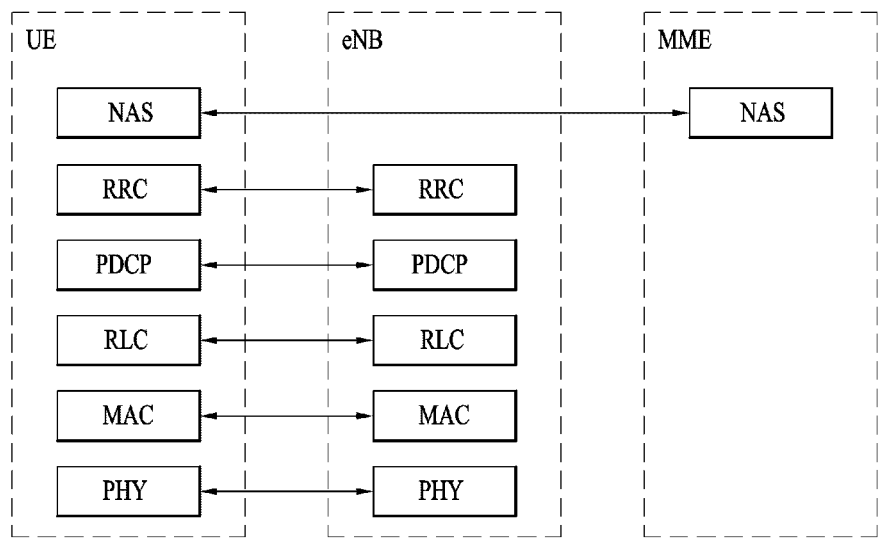
FIG. 2 is a diagram illustrating structures of a control plane and a user plane of a radio interface protocol between a user equipment and E-UTRAN based on the 3GPP radio access network standard.
Figure 2:
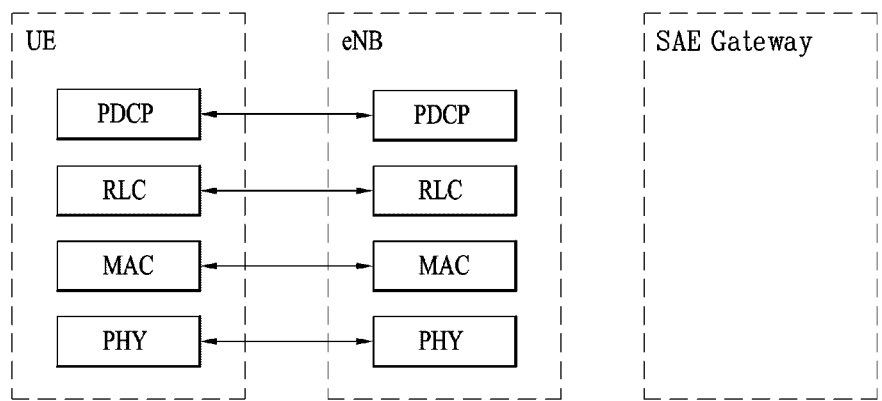

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
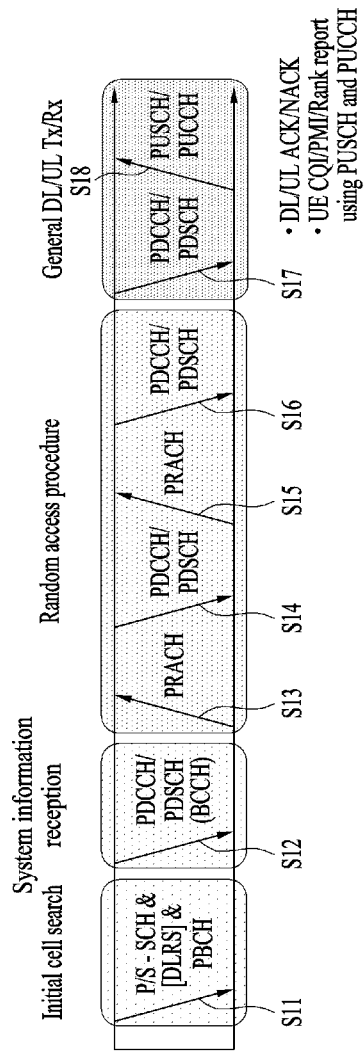
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
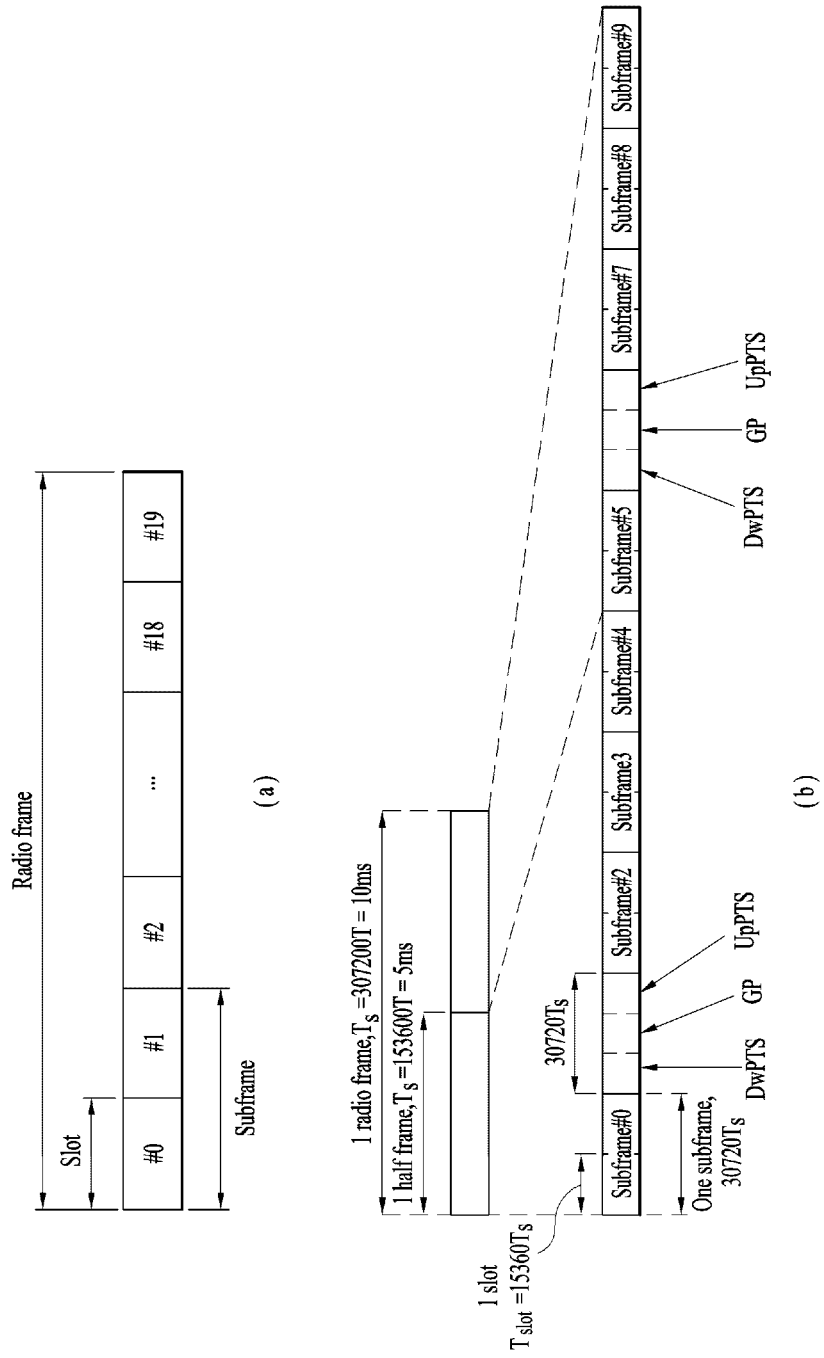
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_S=1/(15000 \times 2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
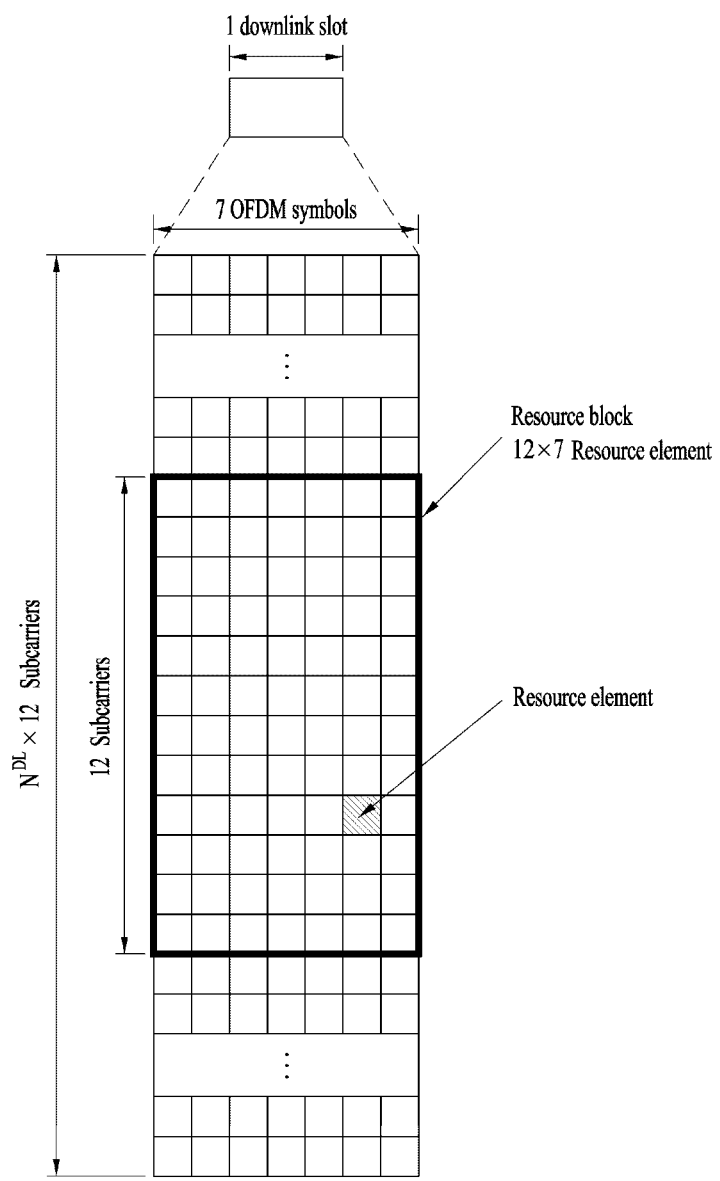
FIG. 5 is a diagram for an example of a resource grid for a downlink slot.

FIG. 5 illustrates a resource grid for a DL slot.

Referring to FIG. 5, a DL slot includes $Ni_{symb}^{DL}$ OFDM symbols in the time domain and $N_{RB}^{DL}$ resource blocks (RBs) in the frequency domain. Since each RB includes $N_{sc}^{RB}$ subcarriers, a DL slot includes $N_{RB}^{DL} \times N_{sc}^{RB}$ subcarriers in the frequency domain. While FIG. 5 illustrates that a DL slot includes 7 OFDM symbols and an RB includes 12 subcarriers, embodiments of the present invention are not limited thereto. For example, the number of OFDM symbols included in a DL slot may be changed according to the length of a cyclic prefix (CP).

Each element in the resource grid is referred to as a resource element (RE). Each RE is indicated by an OFDM symbol index and a subcarrier index. One RB consists of $N_{symb}^{DL} \times N_{sc}^{RB}$ REs. The number of RBs ($N_{RB}^{DL}$) included in a DL slot depends on a DL transmission bandwidth set in a cell.

Figure 6:
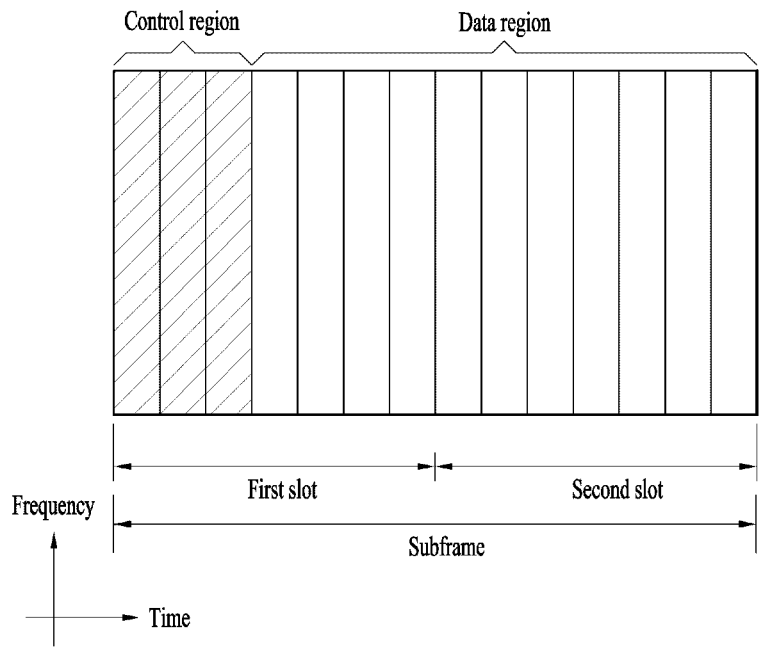
FIG. 6 is a diagram illustrating a structure of a downlink radio frame used in an LTE system.

FIG. 6 illustrates the structure of a DL subframe.

Referring to FIG. 6, up to three or four OFDM symbols positioned at the front part of the first slot in a subframe correspond to a control region to which control channels are allocated. The other OFDM symbols in the subframe correspond to a data region to which a physical downlink shared channel (PDSCH) is allocated. Examples of the aquifer channels used in LTE include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH carries a HARQ acknowledgment (ACK)/negative-acknowledgment (NACK) signal in response to UL transmission HARQ ACK/NACK.

Control information carried on the PDCCH is called downlink control information (DCI). The DCI includes resource allocation information and other control information for a UE or a UE group. For example, the DCI includes DL/UL scheduling information, UL transmit (Tx) power control commands, etc.

The PDCCH carries information about resource allocation and a transmission format for a downlink shared channel (DL-SCH), information about resource allocation and a transmission format for an uplink shared channel (UL-SCH), paging information on a paging channel (PCH), system information on the DL-SCH, information about resource allocation for a higher-layer control message such as a random access response transmitted on the PDSCH, a Tx power control command set for individual UEs in a UE group, Tx power control commands, voice over Internet protocol (VoIP) activation indication information, etc. A plurality of PDCCHs may be transmitted in the control region. A UE may monitor a plurality of PDCCHs. A PDCCH is transmitted on an aggregation of one or more consecutive control channel elements (CCEs). A CCE is a logical allocation unit used to provide a PDCCH with a coding rate based on the state of a radio channel. A CCE corresponds to a plurality of resource element groups (REGs). The format of a PDCCH and the number of PDCCH bits are determined according to the number of CCEs. An eNB determines a PDCCH format according to DCI transmitted to a UE and adds cyclic redundancy check (CRC) to control information. The CRC is masked with an identifier (ID) (e.g. a radio network temporary identifier (RNTI)) according to the owner or use of the PDCCH. For example, if the PDCCH is intended for a specific UE, the CRC may be masked with the ID (e.g., cell-RNTI (C-RNTI)) of the specific UE. If the PDCCH is intended for a paging message, the CRC thereof may be masked with a paging ID (e.g., paging-RNTI (P-RNTI)). If the PDCCH is intended for system information (particularly, a system information block (SIB)), the CRC thereof may be masked with a system information RNTI (SI-RNTI). If the PDCCH is intended for a random access response, the CRC thereof may be masked with a random access-RNTI (RA-RNTI).

Figure 7:
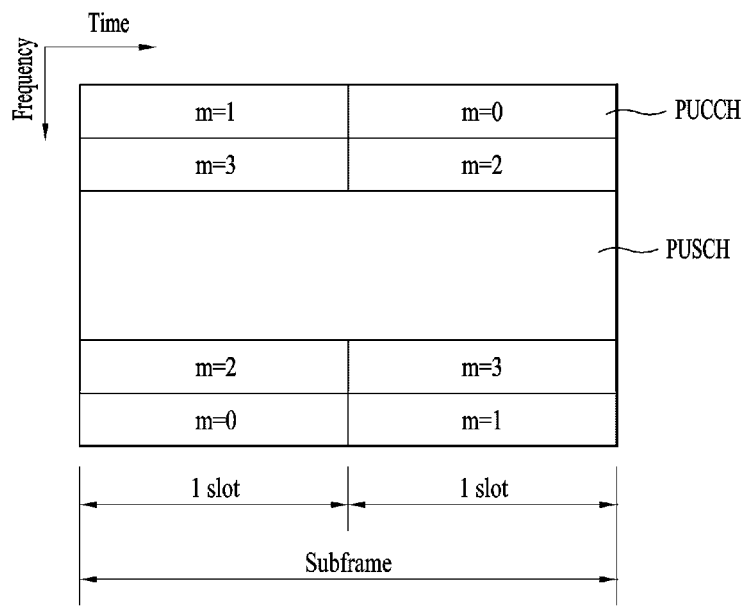
FIG. 7 is a diagram illustrating a structure of an uplink subframe used in an LTE system.

FIG. 7 is a diagram for an example of a structure of an uplink subframe in LTE.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.

CSI (channel state information): Feedback information on a DL channel. CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

In the following, scheduling, which is performed based on inter-device interference (IDI) measurement in a system using full-duplex communication in the same resource, is explained based on the aforementioned contents.

Figure 8:
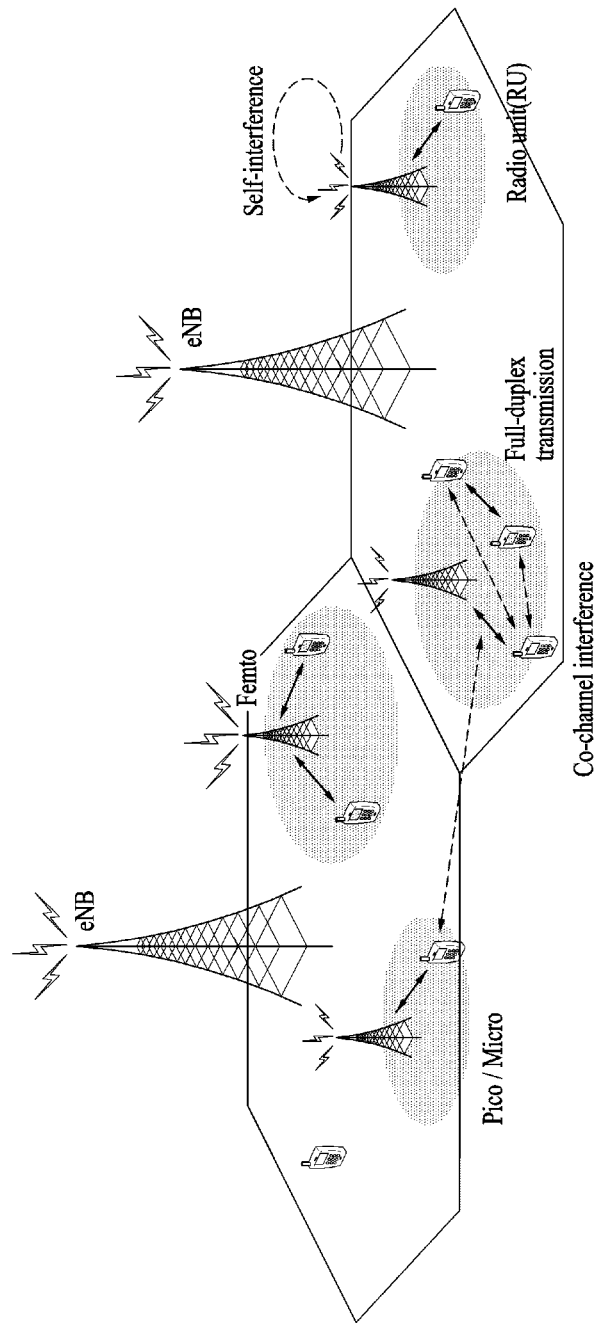
FIG. 8 is a diagram for a full-duplex radio (FDR) communication.

FIG. 8 is a diagram for a full-duplex radio (FDR) communication. Referring to FIG. 8, FDR corresponds to a system performing transmission and reception at the same time using the same resource in a transmission device (e.g., a UE, a base station). In this case, the same resource may correspond to a radio resource having the same time or the same frequency. As shown in FIG. 8, there may exist a UE and an eNB supporting the FDR. In this case, when the FDR is supported, interference can be mainly classified into intra-device interference and inter-device interference. First of all, the intra-device interference may correspond to interference which occurs when a signal transmitted by a transmission antenna is received by a reception antenna in a single eNB or a UE. On the other hand, the inter-device interference may correspond to interference which occurs when an uplink signal transmitted by an eNB/UE is received by a neighboring eNB/UE.

In the following, for clarity, the inter-device interference (hereinafter, IDI) is mainly explained.

Figure 9:
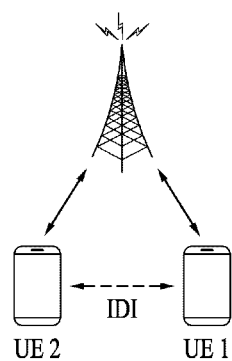
FIG. 9 is a diagram for explaining inter-device interference.

FIG. 9 is a diagram for explaining inter-device interference. Referring to FIG. 9, the IDI corresponds to interference which occurs in FDR only due to the use of the same radio resource in a single cell. FIG. 9 is a diagram for explaining a concept of the IDI, which occurs when an eNB uses a full-duplex (FD) mode (a mode for performing transmission and reception at the same time using the same frequency) in the same resource and a UE uses the full-duplex (FD) mode or a half-duplex (HD) mode (i.e., such a half-duplex mode as the legacy FDD, TDD). Although FIG. 9 shows two UEs only for clarity, it is apparent that the present invention can also be applied to a case that two or more UEs exist.

In a communication system using a legacy full-duplex (FD), since a signal is transmitted and received using FDD (frequency division duplex) or TDD (time division duplex) (i.e., since a signal is transmitted and received using a different transmission resource and reception resource), the IDI does not occur. And, although interference of a neighboring cell of a legacy communication system is still valid in a FDR system, for clarity, the interference is not mentioned in the present invention.

Figure 10:
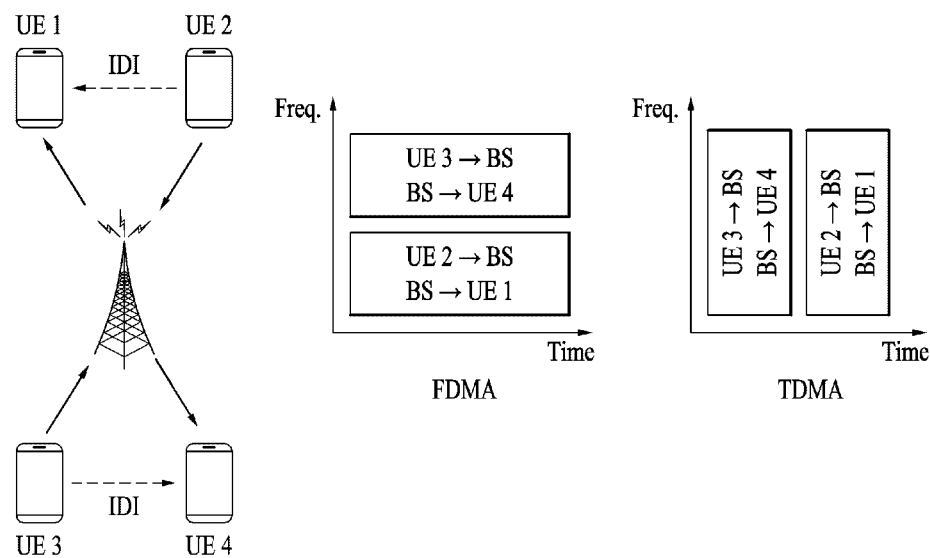
FIG. 10 is a diagram for explaining multiple access of a UE in a FDR system.

FIG. 10 is a diagram for explaining multiple access of a UE in a FDR system. Referring to FIG. 10, in a FDR system, not only a full-duplex scheme using the same resource but also a full-duplex scheme not using the same resource may exist. FIG. 19 illustrates FDMA and TDMA operations when an eNB operates in the full-duplex (FD) mode on the same resource and a plurality of UEs perform multiple access.

The present invention assumes that a frame for measuring interference between non-synchronized devices is configured, a distinction signal is transmitted between devices, and a listening attempt configuration is performed in a TDD (time division duplex) system using full-duplex communication on the same resource. Under this assumption, it may be able to enable transmission and reception to be simultaneously performed in a cell via a UE-specific configuration corresponding to a method of differently allocating a configuration according to a UE in each cell.

In particular, according to the present invention, in order to measure IDI between devices and reduce or eliminated the measured IDI, it may be able to assign a unique signature to each UE or each UE group. In this case, a signal for measuring interference, which is capable of being identified according to a UE, is defined as a signature signal.

Hence, if a UE receives a signature signal, the UE is able to know signal strength of a UE causing IDI, a UE (or signature) index, a channel vector such as a phase, etc., timing information, and the like. Moreover, the signature signal may have various forms such as a code sequence, a puncturing pattern, and the like capable of identifying a UE or a UE group. In particular, it may be able to apply a unique scramble or interleaving of a UE/UE group using a code sequence. In order to make a reception UE easily measure interference, the signature signal can be exclusively transmitted by a UE/UE group only. In this case, an exclusive unit may become the minimum OFDM symbol.

The present invention also assumes that a method of classifying (grouping) UE groups for scheduling UEs causing IDI and a scheme of measuring and reporting IDI for grouping are applicable in the FDR system. In particular, UE groups can be classified using an order of IDI sizes measured by each UE only or can be classified based on an IDI size considering IDI cancellation/mitigation capability of each UE rather than the number of UEs sharing the same resource.

In the following, a method of measuring IDI is explained. The IDI occurs when the same resource is used. For example, when a plurality of UEs (e.g., N number of UEs) form a single group, it may be able to perform IDI measurement on N−1 number of UEs except a UE that measures the IDI. Moreover, each of the N number of UEs, which form the single group, may become a target of the IDI measurement. For example, a UE may transmit an uplink signal and the remaining N−1 number of UEs may receive a downlink signal in each subframe of N number of subframes to measure RSRP (reference signal received power) or RSRQ (reference signal received quality) of the IDI. In this case, each UE can individually measure the IDI using a different subframe among the N number of subframes. Moreover, a size of the IDI can be defined by equation 1 in the following.

$$IDI_{size} = f(d_{IDI}, p_{IDI}, v_{idi}) \qquad \text{[Equation 1]}$$

In equation 1, dIDI corresponds to a parameter indicating a distance between a measuring UE and a target UE, pIDI corresponds to a parameter indicating transmit power of the target UE, and vIDI corresponds to a parameter indicating a transmission direction of the target UE (e.g., uplink/downlink). The size of the IDI can be determined according to the parameters.

Figure 11:
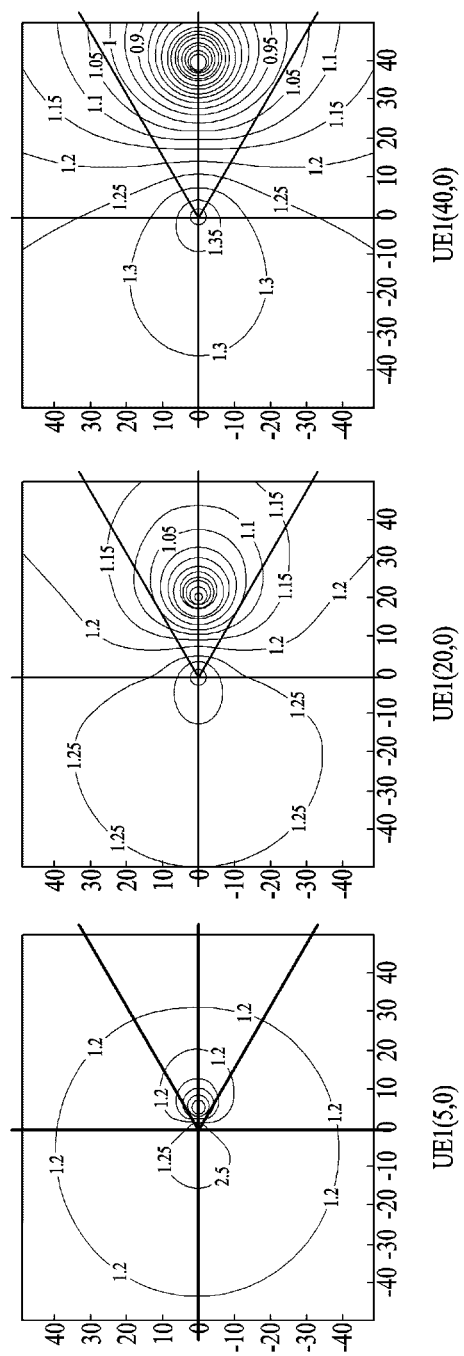
FIG. 11 is a diagram for a gain ratio according to a full-duplex (FD)/half-duplex (HD) communication scheme according to a position of a UE.

FIG. 11 is a diagram for a gain ratio according to a full-duplex (FD)/half-duplex (HD) communication scheme according to a position of a UE. FIG. 11 shows a simulation result indicating a gain of a full-duplex (FD)/half-duplex (HD) mode according to a position of a UE2 in a situation that an eNB is located at an origin and a UE1 is located at a fixed (x,y) axis. FIG. 11 shows an impact of IDI which occurs according to the use of the full-duplex (FD) mode. In FIG. 11, a region where a gain ratio is less than 1 corresponds to an advantageous region when the UE1 and the UE2 use the half-duplex (HD) mode. A region where a ratio gain is greater than 1 (>1) corresponds to an advantageous region when the UE1 and the UE2 use the full-duplex (FD) mode. Hence, if it is able to know positions of the UE1 and the UE2, it is able to easily select a mode of each UE.

Figure 12:
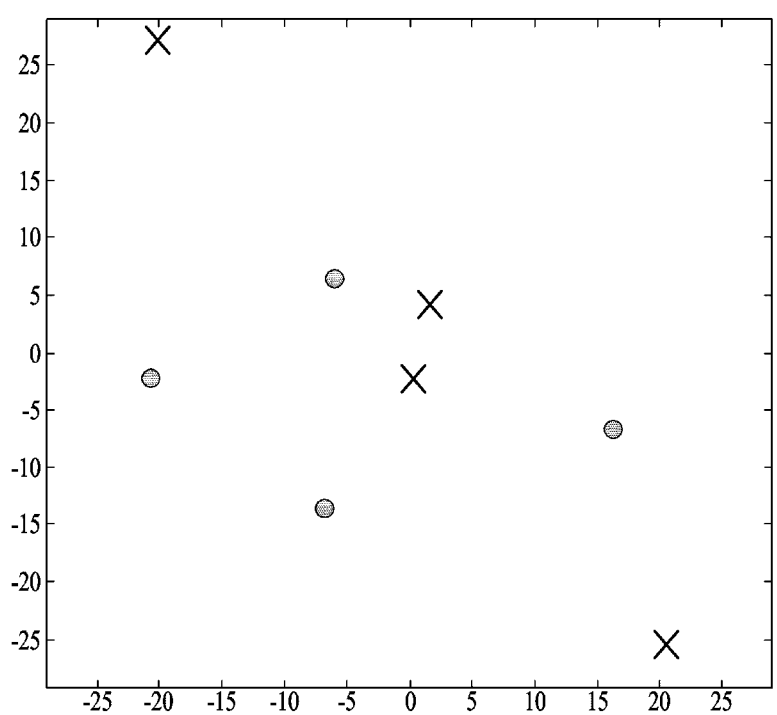
FIG. 12 is a diagram for explaining a case of selecting multiple users of a full-duplex (FD) mode scheme when a plurality of users exist.

FIG. 12 is a diagram for explaining a case of selecting multiple users of a full-duplex (FD) mode scheme when a plurality of users exist. Specifically, FIG. 12 shows a simulation result for a case of selecting 4 users using the full-duplex (FD) mode, i.e., the same frequency, from among 8 users. For example, assume that an eNB is located at an origin. In this case, if 4 users represented by 'X' use the full-duplex (FD) mode, it may be able to increase maximum frequency efficiency. In particular, FIG. 12 shows a simulation result that selects 2 users close to the eNB and 2 users far from the 2 users close to the eNB.

In particular, as shown in FIG. 12, when 4 users are selected, if positions of the users are configured as a table in advance in consideration of all cases that each of 8 users selects the half-duplex (HD) or the full-duplex (FD) mode (28=256 cases), although a position of a user is changed, it is able to easily select 4 users of the full-duplex (FD) mode.

Figure 13:
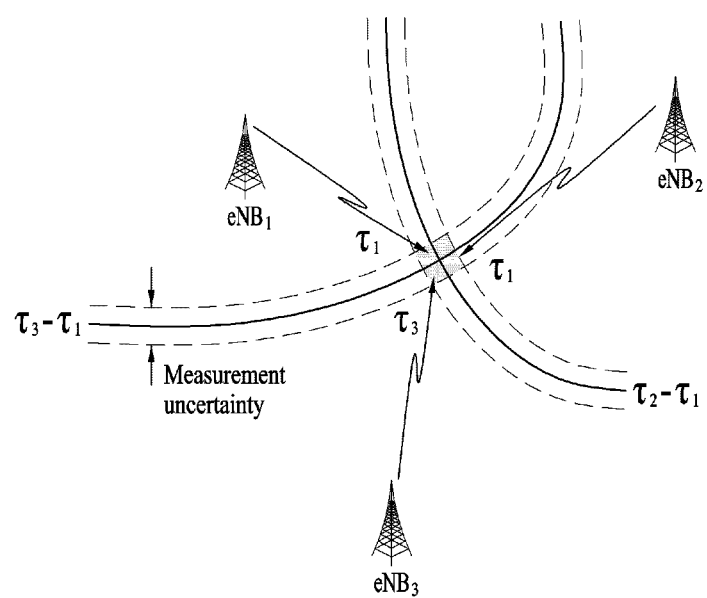
FIG. 13 is a diagram for explaining a legacy technology for collecting a position of a user equipment.

FIG. 13 is a diagram for explaining a legacy technology for collecting a position of a user equipment. A method of measuring an absolute position of a user equipment (e.g., terminal) exists not only in a determination technology of third generation mobile communication but also in determination technologies based on LTE and Wi-Fi (e.g., LTE network based determination technology: E-CID (Enhanced Cell-ID), OTDOA (Observed Time Difference of Arrival), A-GNSS (Assisted-Global Navigation Satellite System)). The above-mentioned determination technologies correspond to a scheme of determining a position of a user based on accurate positions of 3 or more reference devices (e.g., 3 eNBs in LTE) on the basis of triangulation. FIG. 13 illustrates a determination scheme using OTDOA. In particular, FIG. 13 shows a case of determining a user position via triangulation based on a distance measured by each of 3 eNBs.

However, the aforementioned determination schemes of a legacy wireless communication system are not appropriate for a small cell (minimum number of eNB is 1) using FDR and have a demerit in that time taken for determining an absolute position is long.

In the following, a relative determination scheme based on an IDI size, which is usable for selecting a full-duplex (FD)/half-duplex (HD) mode UE, is explained based on the aforementioned contents to maximize frequency efficiency in the FDR proposed by the present invention.

In particular, in order to schedule a UE, it may consider a channel status between an eNB and the UE, an IDI avoidance scheme using a pre-coder for applying MIMO, and the like. Yet, in the present invention, a determination scheme for performing scheduling to avoid/mitigate IDI according to an IDI size is explained. As a main scheme for avoiding IDI, it may use a scheme of selecting FD/HD mode selected by a UE.

In order to maximize frequency efficiency in the FDR, the present invention proposes a relative determination scheme based on an IDI size capable of being used for selecting a full-duplex (FD)/half-duplex (HD) mode UE. In particular, it may be able to perform scheduling not only based on an IDI size considering IDI cancellation/mitigation capability of each UE but also based on the number of UEs sharing a resource.

In particular, in order to consider the IDI size and the number of UEs at the same time, it may be able to perform scheduling based on a relative position between an eNB and a UE and a relative position between UEs. An IDI size between UEs can be calculated by equation 2 in the following based on a distance between the UEs. This scheme corresponds to an RSS (received signal strength) scheme for estimating a distance using strength of a signal received by a UE.

$$P_r(d) = P_0(d_0) - 10 n_p \log 10\left(\frac{d}{d_0}\right) + X_\sigma \quad \text{[Equation 2]}$$

Although a form and parameters of equation 2 may vary according to a system, the equation 2 shows a general form. Pr corresponds to receive power, P0 corresponds to transmit power, d0 corresponds to a reference distance, d corresponds to a distance between a transmitter and a receiver, np corresponds to a path-loss exponent, and $X_\sigma$ corresponds to shadowing. Hence, it may be able to know a value of the distance d via the equation 2.

In order to make an eNB know a distance of each UE, i) UEs measure the d via the equation A based on a reference signal of the eNB and feedback the d (one measurement time is required), ii) the eNB receives a reference signal for measuring IDI from each UE to measure the d (feedback on a distance between the eNB and a UE is not necessary), or iii) the eNB may receive distance information on a UE for TA (timing advance).

A UE measures IDI and then feedbacks the measured IDI to the eNB. In this case, since the UE feedbacks the measured IDI value to the eNB by quantizing the IDI value, an error (round-off error) may occur due to the quantization.

Figures 14, 15:
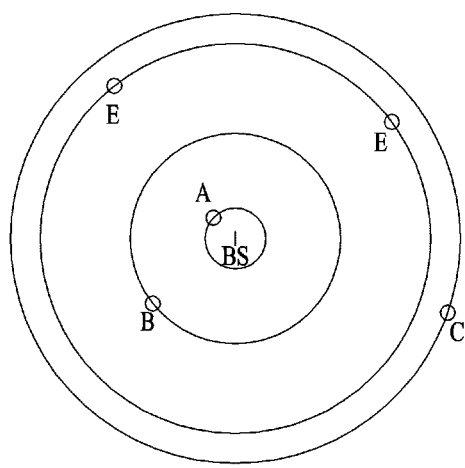
FIGS. 14 and 15 are diagrams for explaining distance arrangement of a base station and a UE on the basis of the base station using a circle.

FIGS. 14 and 15 are diagrams for explaining distance arrangement of a base station and a UE on the basis of the base station using a circle. As shown in FIG. 14, assume a case that a base station and UEs are practically deployed. When an error does not occur in a distance between the base station and a UE and a distance between UEs, a method of measuring a UE position using a distance value measured for the practical deployment of the base station and the UEs is explained.

A distance shown in FIG. 15 corresponds to a value necessary to be scaled according to a size of FIG. 14. A relative ratio for the value is identical to a ratio of a distance between a base station and a UE and a ratio of a distance between UEs. In particular, the relative ratio indicates a relative distance, when a distance between the base station (BS) and a UE A is regarded as a unit of 1. Moreover, for clarity, assumes that each of measuring UEs shown in FIG. 15 is aware of an IDI size of a target UE via IDI measurement in the present invention.

Figure 16:
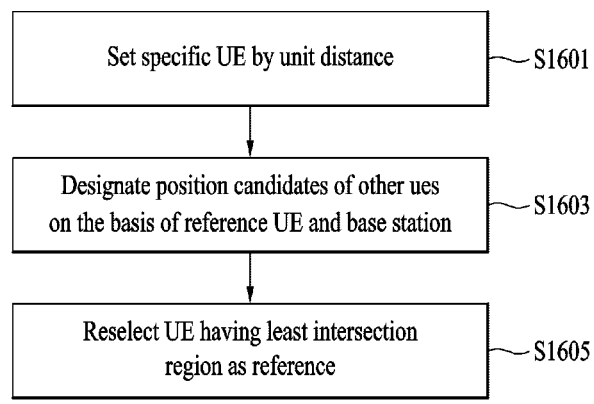
FIGS. 16 to 19 are diagrams for an embodiment of a method of measuring a UE position according to the present invention.

FIG. 16 is a flowchart for one embodiment of a method of measuring a UE position according to the present invention based on FIGS. 14 and 15. In this case, for clarity, assume that an X axis and a Y axis configured to be orthogonal to each other exist on the basis of a base station and a region adjacent to the base station is configured using the X axis and the Y axis.

In the step S1601, a UE is randomly designated by a BS and the UE is configured by a prescribed unit distance in '+' direction or '−' direction on the x axis. For example, UE A is configured to be positioned at a position apart from the base station as much as 1 unit in '−' direction.

In the step S1603, a UE (i.e., reference UE) is designated, a boundary (e.g., circle) is configured based on the radius corresponding to a distance between the reference UE and other UEs measured by the reference UE, and a boundary (e.g., circle) is configured based on the radius corresponding to a distance between the base station and the UEs. In this case, points where both boundaries are met are designated as a position candidate set of other UEs.

Figure 17:
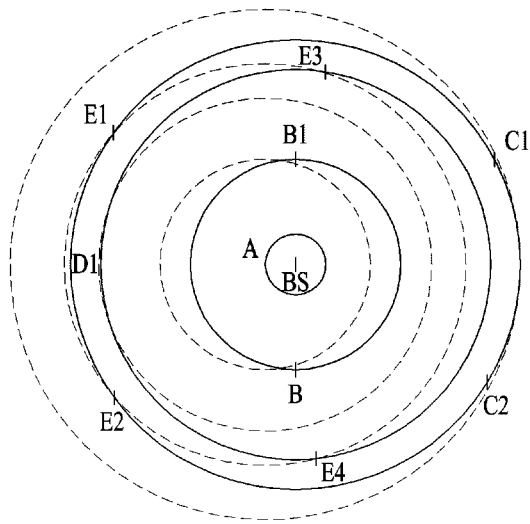

FIG. 17 is a diagram for explaining a result according to the step S1603. Referring to FIG. 17, a boundary is configured based on the radius corresponding to a distance between a designated UE (e.g., UE A) and other UEs measured by the UE A and a boundary is configured based on the radius corresponding to a distance between the BS and other UEs. In this case, points where both boundaries are met can be designated as a UE position candidate set. In this case, the points are represented as B1, B2, C1, C2, E1, E2, E3, and E4. In this case, B1 and B2 correspond to a position candidate set of UE B, C1 and C2 correspond to a position candidate set of UE C, and E1, E2, E3, and E4 correspond to a position candidate set of UE E.

Hence, when a plurality of boundaries configured by each of devices intersect, a UE position candidate set can be configured by equation 3.

$$\begin{cases} x^2 + y^2 = c_1^2 \\ (x-a)^2 + (y-b)^2 = c_2^2 \end{cases} \quad \text{[Equation 3]}$$

In equation 3, c1 corresponds to a distance between a BS and a UE to be measured, c2 corresponds to a distance between a corresponding UE and a UE to be measured, and a and b correspond to absolute values corresponding to x axis and y axis, respectively, of a corresponding UE.

Hence, x and y values determined by equation 3 indicate a position coordinate of a UE to be measured. For example, if a corresponding UE corresponds to UE A and a position of UE B is to be determined, it may be represented as equation 4.

$$\begin{cases} x^2 + y^2 = 3.5^2 \\ (x-1)^2 + (y-0)^2 = 3.6^2 \end{cases} \quad \text{[Equation 4]}$$

In this case, since the boundaries move on the basis of the x axis in the step S1601, points where the boundary on the basis of the UE A and the boundary on the basis of the BS are met always form X axis symmetry.

In the step S1605, the step S1603 is repeated on the basis of a point (e.g., UE D), which has least intersection points among a UE position candidate set, to determine positions of the remaining UEs. Yet, since most of points have two or more values, the present invention explains an additional position measurement procedure on the basis of the UE B2.

FIGS. 18 and 19 are diagrams for explaining a result according to the step S1605. Referring to FIG. 18, a boundary is configured with the radius corresponding to a distance between a UE B2 and other UEs measured by the UE B2. Then, points met with the UEs, which are designated as a position candidate set in the step S1603, are designated as a new position candidate set. In this case, if a UE has a single intersection point, a position of the UE can be determined.

Figure 18A:
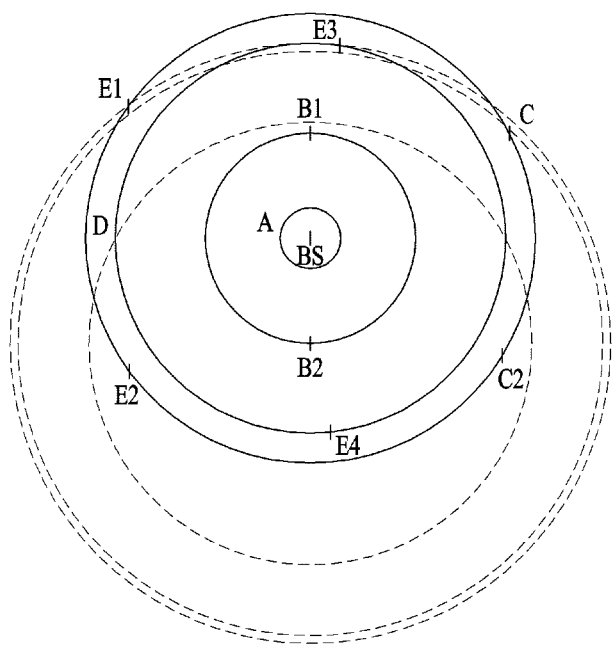
Figure 18B:
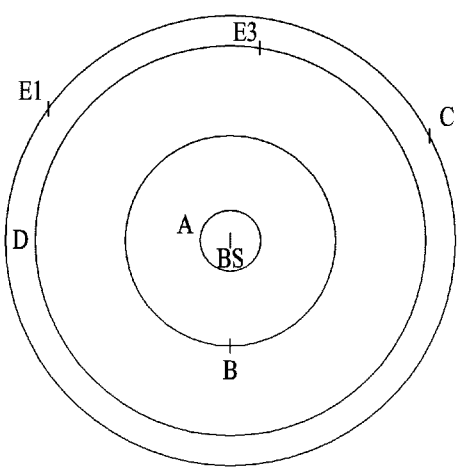

In particular, as shown in FIG. 18(a), if the boundary on the basis of the UE B2 is met with C1 belonging to the position candidate set, as shown in FIG. 18(b), a relative position of UE C can be determined by the C1. And, among the position candidate sets E1 to E4 of UE E which are determined in the previous step, the E1 and the E3, which are met with the boundary on the basis of the UE B, can be designated as a new candidate set only.

Figure 19A:
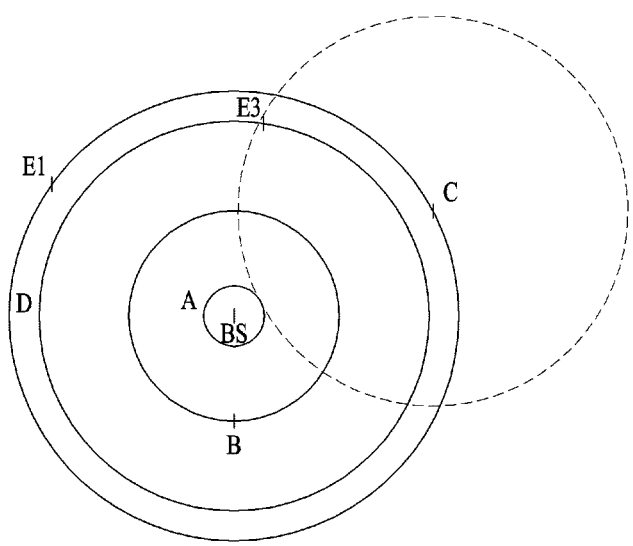

Moreover, the steps S1601 to S1605 can be repeatedly performed until positions of all UEs are determined. In particular, as shown in FIG. 19(a), if a boundary configured on the basis of the UE C is met with an undetermined position candidate set, as shown in FIG. 19(b), the E3 can be determined as a position of the UE E.

Figure 19B:
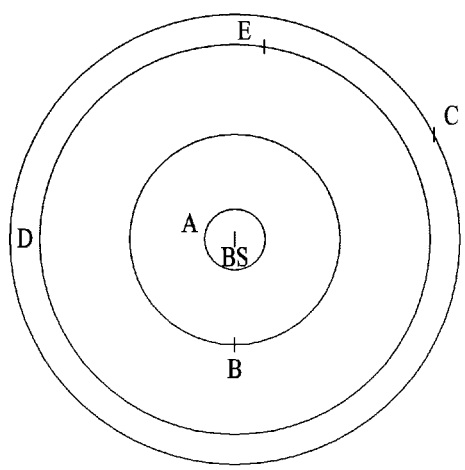

Hence, the final arrangement of the UE A to the UE E can be represented as FIG. 19(b). Compared to the UE arrangement shown in FIG. 14, it is able to see that absolute positions of UEs shown in FIG. 19(b) are not the same. Yet, FIG. 19(b) can be appropriate for performing scheduling based on a UE position.

In particular, since position measurement is performed based on an IDI size in the present invention, UEs are deployed in a form of rotating the UEs on the basis of a BS according to a position of a UE firstly designated in the step S1601. Hence, it is difficult to check absolute positions of the UEs. However, it is able to check a relative position of the UEs, although the UEs are deployed in a manner of being rotated. Hence, if scheduling is performed according to an IDI size, it may be able to perform the scheduling using relative positions of the UEs. For example, referring to FIG. 12, although the UEs rotate on the basis of the origin, relative positions of the selected 4 UEs do not change.

Hence, position measurement according to the present invention and a scheduling scheme based on the position measurement can also be applied to D2D where a single BS exists only. If the BS is able to know a single absolute position of a UE among UEs, the BS is able to know absolute positions of entire UEs. Hence, it may be able to reduce complexity by using the equation 2 rather than the complex triangulation.

A UE feeds back an IDI measurement value to a base station by quantizing the IDI measurement value. Hence, an error (round-off error) may occur due to the quantization. The present invention can designate a candidate set in consideration of the error (round-off error) due to the quantization.

Figure 20:
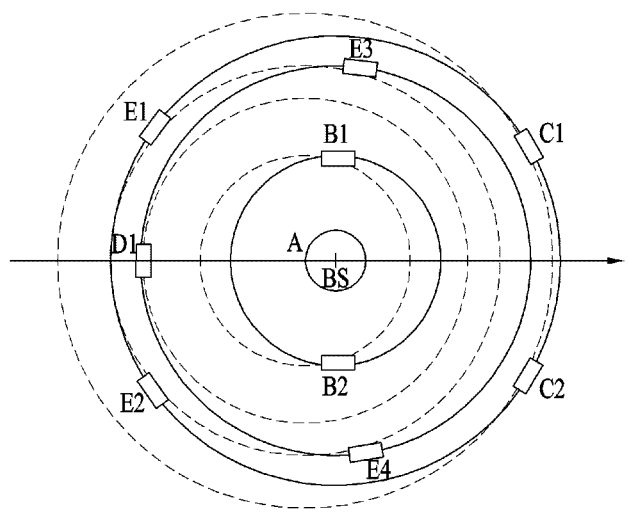
FIG. 20 is a diagram for explaining a case of designating a candidate set in consideration of a round-off error due to quantization.

FIG. 20 is a diagram for explaining a case of designating a candidate set in consideration of a round-off error due to quantization. As shown in FIG. 20, a boundary having a radius corresponding to a distance between a UE and other UEs measured by the UE may have an error region as much as an error (round-off error) due to quantization. In particular, it may be able to apply equation 5 rather than equation 3. Referring to FIG. 14, the positions of the points where the boundaries are met are designated as a candidate set of UEs that satisfy the equation 6 in consideration of the error region.

$$(c_2-\alpha)^2 (x-a)^2+(y-b)^2 \leq (c_2+\alpha)^2 \quad \text{[Equation 5]}$$

$$\begin{cases} x^2 + y^2 = c_1^2 \\ (c_2 - \alpha)^2 \leq (x - a)^2 + (y - b)^2 \leq (c_2 + \alpha)^2 \end{cases} \quad \text{[Equation 6]}$$

In equations 5 and 6, α corresponds to a value indicating an error (round-off error) due to quantization. The α can be determined according to the number of feedback bits. In FIG. 20, a range of an error region due to quantization can be represented as 2α.

Moreover, in the aforementioned steps S1605, although the position measurement procedure is performed by randomly selecting a UE from among candidate UEs in the step S1603, since the equation 6 indicates a region where a candidate UE is capable of being positioned, it is unable to apply the S1605 as it is.

Figure 21:
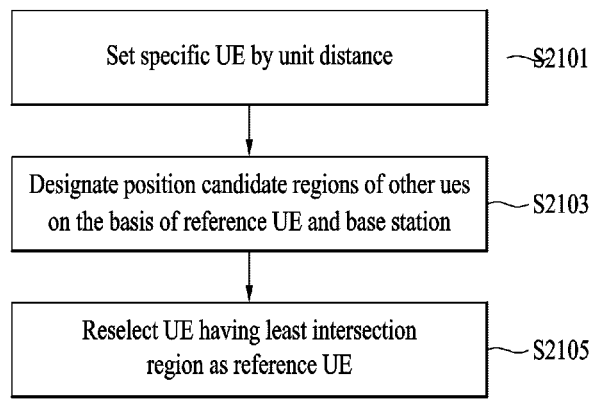
FIG. 21 is a flowchart for explaining one embodiment of the present invention in consideration of an error region due to quantization.

FIG. 21 is a flowchart for explaining one embodiment of the present invention in consideration of an error region due to quantization.

In the step S2101, a base station (BS) designates a random UE (reference UE) and configures the UE as a prescribed unit distance on x axis.

In the step S2103, the designated UE reduces the number of candidate UEs or a region using the equation 6 to determine a UE position represented by the region. In particular, a position coordinate of a UE (i.e., x,y) is represented by a region (i.e., inequality region) over a prescribed range through the equation 6. This happens due to the existence of α. +(α+c), −(α+c) values determine a region, which becomes a position coordinate of a UE (i.e., The +(α+c), −(α+c) values appear at both ends of the inequality of the x,y value. In this case, c value corresponds to the remaining constant values except the α when the equation 6 of the x,y value is calculated). Hence, if a center point of the region, which becomes the position coordinate of the UE, is selected, it may be able to make the error (round-off error) due to the quantization to be disappeared (a feedback value not including the error (round-off error) due to the quantization) or it may be able to select a UE of a position calculated by the equation 3.

In the step S2105, a UE having the least intersection region is reconfigured as a reference UE. The step S2103 is repeatedly performed until positions of all UEs are determined.

In this case, when a feedback is made, not only an error (round-off error) due to quantization but also an error due to incorrect measurement may occur. And, if a UE moves at the time of performing measurement (i.e., if time of measuring UEs is little bit deviated), it can be recognized as an error although it is not an actual error. This measurement error changes the numbers shown in FIG. 15 and changes the c1 and c2 values of the equation 6. Hence, the equation 6 can be changed to equation 7 in consideration of the measurement error.

$$\begin{cases} \max\{(c_1 - \beta_1)^2, (c_1 - \sigma_1)^2\} \leq x^2 + y^2 \leq \\ \quad \min\{(c_1 + \beta_1)^2, (c_1 + \sigma_1)^2\} \\ \max\{(c_2 - \alpha_2 - \beta_2)^2, (c_2 - \sigma_2)^2\} \leq \\ \quad (x - a)^2 + (y - b)^2 \leq \\ \quad \min\{(c_2 + \alpha_2 + \beta_2)^2, (c_2 + \sigma_2)^2\} \end{cases} \quad \text{[Equation 7]}$$

In equation 7, β corresponds to a measurement error and a subscript shown in the equation 7 is used for identifying each UE. In particular, a parameter (α, β, σ) to which a subscript is attached may vary according to a UE. The α corresponds to a maximum error, which is allowable when a measurement error is considered or when the measurement error and a quantization error are considered. The σ can be adjusted according to values fed back via a position measurement procedure. The σ can be changed/reconfigured by a bigger value or a smaller value according to whether or not IDI cancellation/mitigation is failed.

Moreover, a base station can inform a UE of the number of feedback bits according to the σ to make the UE control the number of feedback bits. For example, if a measurement error is greater than the σ, in particular, if a parameter including the σ is selected according to a rule configured to select a minimum value or a maximum value in equation 7, the UE can be excluded from the position measurement procedure. This can be regarded as being identical to a procedure of eliminating a row of the UE from the table shown in FIG. 15.

In the equation 7, if the σ is not determined yet, a region of a candidate UE may change due to a measurement error. When position measurement is attempted using a UE including a significantly changed region, if there is no section met with the region of the candidate UE, it is able to know that the UE has a significant measurement error. Hence, it may be able to discover a UE at which a measurement error occurs by additionally performing the steps described in the following.

Figure 22:
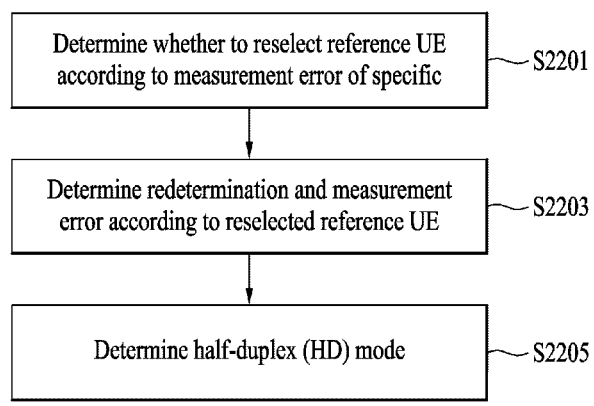
FIG. 22 is a flowchart for explaining a method of determining a UE at which a measurement error occurs using a half-duplex (HD) mode according to one embodiment of the present invention.

FIG. 22 is a flowchart for explaining a method of determining a UE at which a measurement error occurs using a half-duplex (HD) mode according to one embodiment of the present invention.

In the step S2201, a base station (BS) designates a random UE and deploys the UE in a prescribed distance on the x axis. In this case, if the BS determines that the UE has a significant measurement error, the BS reselects a reference UE and performs position measurement again.

In the step S2203, the BS attempts to perform position measurement again using a UE including a less changed region and checks whether or not there is a section met with a candidate UE region.

In this case, if there is a section not intersected with the candidate UE region, the steps S2201 and the step S2203 are repeatedly performed. If the number of sections met with the candidate UE region is less than a specific number although the steps are repeatedly performed, it is determined as a measurement error occurs at a UE (a UE positioned at the center of a circle) attempting to measure a position.

In the step S2205, if a measurement error occurs at a specific UE for more than prescribed time, it is able to make the UE operate in a half-duplex (HD) mode. In particular, the UE can be determined as a fast moving UE or a UE in which IDI measurement is not easy.

Figure 23:
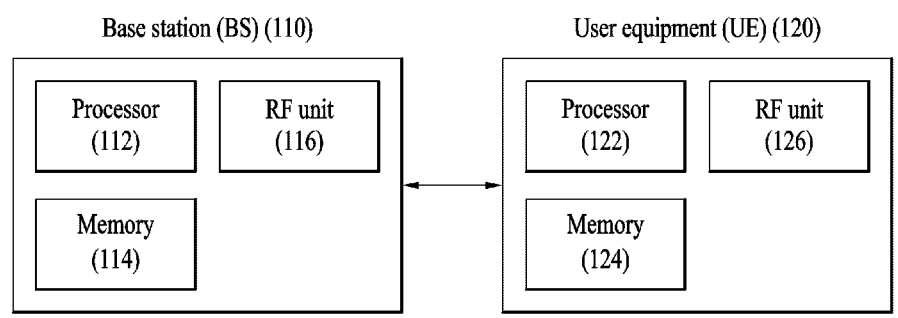
FIG. 23 is a diagram for a base station and a UE applicable to one embodiment of the present invention.

FIG. 23 is a diagram for a base station and a UE applicable to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 23, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the method of measuring a UE position in a full-duplex wireless communication system and an apparatus therefor are described centering on examples applied to 3GPP LTE system, it may be applicable to various wireless communication systems as well as to the 3GPP LTE system.

What is claimed is:

1. A method of measuring positions of a plurality of UEs, which are measured by a base station in a wireless communication system supporting full-duplex communication, comprising the steps of:

setting a unit distance based on an IDI (inter-device interference) size to a first UE;

determining at least one intersection region, which is overlapped between at least one first boundary configured according to at least one first relative distance based on the unit distance on the basis of the base station and at least one second boundary configured according to at least one second relative distance based on the unit distance on the basis of the first UE, as at least one or more position candidates for a second UE; and assuming a specific position candidate among the at least one or more position candidates as a position of the second UE and checking whether or not at least one third boundary configured according to at least one third relative distance based on the unit distance on the basis of the assumed position of the second UE is overlapped with the intersection region, wherein the at least one first relative distance corresponds to distances of a plurality of the UEs which are measured by the base station according to the IDI size, wherein the at least one second relative distance corresponds to distances of a plurality of the UEs which are measured by the first UE according to the IDI size, and wherein the at least one third relative distance corresponds to distances of a plurality of the UEs which are measured by the second UE according to the IDI size.

2. The method of claim 1, if the at least one third boundary is overlapped with the intersection region, further comprising the step of determining the specific position candidate as the position of the second UE.

3. The method of claim 1, wherein the IDI size is determined by a first UE performing full-duplex communication-based downlink communication based on an interference amount caused by a second UE performing full-duplex communication-based uplink communication.

4. The method of claim 1, wherein the IDI size is determined according to at least one selected from the group consisting of a distance between a measuring UE and a target UE, transmit power of the target UE, and information on whether the target UE performs uplink or downlink.

5. The method of claim 1, wherein the at least one intersection region is configured to contain an error region of an IDI (inter-device interference) measurement value.

6. The method of claim 5, wherein the at least one or more position candidates for the second UE are determined by a center point of the error region.

7. The method of claim 5, wherein the error region is determined according to the number of bits for performing feedback on the IDI measurement value.

8. The method of claim 1, if at least a part of the error region exceeds a predefined maximum error region range, further comprising the step of reconfiguring the second UE.

9. The method of claim 1, if the at least one third boundary is not overlapped with the intersection region, further comprising the step of reconfiguring the second UE.

10. A base station performing UE position measurement in a wireless communication system supporting full-duplex communication, comprising:

an RFU (radio frequency unit); and a processor, the processor configured to set a unit distance based on an IDI (inter-device interference) size to a first UE, the processor configured to determine at least one intersection region, which is overlapped between at least one first boundary configured according to at least one first relative distance based on the unit distance on the basis of the base station and at least one second boundary configured according to at least one second relative distance based on the unit distance on the basis of the first UE, as at least one or more position candidates for a second UE, the processor configured to assume a specific position candidate among the at least one or more position candidates as a position of the second UE and check whether or not at least one third boundary configured according to at least one third relative distance based on the unit distance on the basis of the assumed position of the second UE is overlapped with the intersection region, wherein the at least one first relative distance corresponds to distances of a plurality of the UEs which are measured by the base station according to the IDI size, wherein the at least one second relative distance corresponds to distances of a plurality of the UEs which are measured by the first UE according to the IDI size, and wherein the at least one third relative distance corresponds to distances of a plurality of the UEs which are measured by the second UE according to the IDI size.

* * * * *